United States Patent
Debaes et al.

(10) Patent No.: US 10,820,140 B2
(45) Date of Patent: Oct. 27, 2020

(54) BROKER FOR EMULATING A LOCATION DEVICE

(71) Applicant: AWINGU NV, Ghent (BE)

(72) Inventors: Christof Debaes, Lembeek (BE); Kurt Bonne, Haren (BE); Pieter De Clerck, Zwijnaarde (BE)

(73) Assignee: AWINGU NV, Ghent (BE)

( * ) Notice: Subject to any disclaimer, the term of this patent is extended or adjusted under 35 U.S.C. 154(b) by 39 days.

(21) Appl. No.: 16/089,481

(22) PCT Filed: Mar. 28, 2017

(86) PCT No.: PCT/EP2017/057290
§ 371 (c)(1),
(2) Date: Sep. 28, 2018

(87) PCT Pub. No.: WO2017/167736
PCT Pub. Date: Oct. 5, 2017

(65) Prior Publication Data
US 2019/0124467 A1    Apr. 25, 2019

(30) Foreign Application Priority Data
Mar. 29, 2016 (EP) .................................... 16162578

(51) Int. Cl.
*H04W 4/021* (2018.01)
*H04L 29/08* (2006.01)
(Continued)

(52) U.S. Cl.
CPC ........ *H04W 4/021* (2013.01); *G06Q 30/0205* (2013.01); *H04L 67/02* (2013.01);
(Continued)

(58) Field of Classification Search
None
See application file for complete search history.

(56) References Cited

U.S. PATENT DOCUMENTS

2010/0036906 A1* 2/2010 Song .................... H04L 65/605
709/203
2012/0284322 A1* 11/2012 Laborczfalvi ......... H04W 4/021
709/202
(Continued)

FOREIGN PATENT DOCUMENTS

| JP | 2007089051 A | 4/2007 |
| JP | 2010193348 A | 9/2010 |
| WO | 2011129726 A1 | 10/2011 |

OTHER PUBLICATIONS

Carboni et al., "The Web Around the Corner: Augmenting the Browser with GPS," Proceedings of the 13th International Conference on World Wide Web—Alternate Track Papers & Posters, May 17-22, 2004, pp. 318-319.
(Continued)

*Primary Examiner* — German Viana Di Prisco
(74) *Attorney, Agent, or Firm* — Workman Nydegger (57) ABSTRACT

A broker for communicating with an HTML client running on a client device and with an application running on a remote application server through a web session, said broker comprising: a geolocation information collecting unit, adapted to collect geolocation information from said HTML client; a geolocation processing engine, configured to process said geolocation information, thereby generating location device signalling; and a transmitting module, adapted to transmit said location device signalling to an application server session of said remote application server, thereby emulating a location device.

10 Claims, 7 Drawing Sheets

(51) Int. Cl.
*G06Q 30/02* (2012.01)
*H04W 64/00* (2009.01)

(52) U.S. Cl.
CPC ............. *H04L 67/08* (2013.01); *H04L 67/18* (2013.01); *H04W 64/003* (2013.01)

(56) References Cited

U.S. PATENT DOCUMENTS

| | | |
|---|---|---|
| 2012/0317615 A1 | 12/2012 | Geva et al. |
| 2014/0012941 A1 | 1/2014 | Smith et al. |
| 2015/0120436 A1* | 4/2015 | Duleba .............. G06Q 30/0246 705/14.45 |
| 2017/0213256 A1* | 7/2017 | Ghdeeb .............. G06Q 30/0277 |

OTHER PUBLICATIONS

Extended European Search Report from EP Application No. EP 16162578, dated Oct. 31, 2016.
International Search Report from PCT Application No. PCT/EP2017/057290, dated Jun. 7, 2017.

* cited by examiner

BROKER FOR EMULATING A LOCATION DEVICE

FIELD OF THE INVENTION

The present invention generally relates to geolocation information processing. More particularly, the invention concerns the provisioning of geolocation information of clients, i.e. information indicative for the position or location of client devices or useful for calculating the position or location of client devices, to remote applications that require such location or position. A remote application in the context of the present invention is a software application running on a remote server, e.g. an application server in the enterprise network of a company, or an application server in a public cloud. A client device in the context of the present invention may be any portable or mobile device whereon for example a browser or HTML client is installed or can be installed. Examples of such client devices are a smartphone, a tablet computer, a laptop or other portable computer, etc.

BACKGROUND OF THE INVENTION

Many applications require location information of portable client devices that connect with or use these applications. In transport industry for instance, enterprises use applications to geographically locate each employee, car, truck, bus, etc., in order to protect the security of their employees and/or their equipment. Thereto, they equip each employee, car, truck, bus, etc., for instance with a device that determines and reports its geographical coordinates regularly. Telecom service companies that deploy professionals to install, replace or fix telecom cables also use applications to geographically locate and guide such professionals. The geographic location of a professional may again be communicated to an application running remotely on a server in the companies enterprise network through a client device carried by the professional. The application may for instance calculate a geographic path or route to be followed by each professional in function of his/her actual location and next locations where an intervention is needed.

Geolocation information may be acquired and processed according to various methods. Examples may involve Global Positioning System receivers, also referred to as GPS receivers or alternative satellite based positioning technology such as Galileo, Beidu, Glonass, etc., or other systems employing, for example, triangulation based upon precise timing, signal strengths, and/or other parameters associated with radio frequency signals received from multiple reference sites. Other information useful for the calculation of a client device's location may be available in the client device, like for instance the IP address of the client device.

US2012/0317615 describes a computer-implemented system comprising a location broker component of a stationary computing device that receives from a broker service location information associated with a remote user device. The location information is then exposed to applications running on the stationary computing device via a device driver that emulates a location of the remote user device. The applications process the location information and execute corresponding application functions based on the location information. The stationary computing device described in US2012/0317615 therefore emulates the location of a remote user device using location information received from a location device integrated in or connected to the remote user device. This is generally known as device redirection.

Each stationary computing device must therefore comprise a device driver adapted to emulate a location of a remote user device. To each remote user device corresponds such a device driver. In other words, each stationary computing device comprises a plurality of device drivers adapted to emulate locations of respective remote user devices. The implementation of the computer-implemented system described in US2012/0317615 is therefore complex and resource intensive.

It is an objective of the present invention to disclose a solution that overcomes the above identified shortcomings of existing solutions. More particularly, it is an objective to disclose a solution for providing geolocation information to remote applications without requiring location devices at the clients and without requiring corresponding device drivers for all clients at the application servers.

SUMMARY OF THE INVENTION

According to a first aspect of the present invention, the above defined objectives are realized by a broker for communicating with an HTML, client running on a client device and with an application running on a remote application server through a web session, the broker comprising:
- a geolocation information collecting unit, adapted to collect geolocation information from the HTML client;
- a geolocation processing engine, configured to process the geolocation information, thereby generating location device signalling; and
- a transmitting module, adapted to transmit the location device signalling to an application server session of the remote application server, thereby emulating a location device.

Thus, the broker according to the present invention is adapted to collect geolocation information from an HTML client running on the client device and to emulate a location device, e.g. a GPS receiver, without requiring such location device to be present at the client device. Geolocation information comprises information useful in determining the geographic location of the client device and available at the HTML client, for example coordinates such as longitude and latitude, an address, a street name, a city, a country, an IP address, etc. The HTML client might be a browser running on the client device, such as a browser running on a laptop computer, a browser running on a tablet, a browser running on a smartphone, or a browser running on any other suitable portable client device. The broker according to the present invention is adapted to emulate a location device by generating location device signalling, e.g. GPS signalling, from the collected geolocation information. As a result, GPS signalling, as would be produced by a GPS receiver present at the location of the client device, will be generated.

The broker in accordance with the present invention is adapted to determine geographic locations of client devices from geolocation information collected from a browser running on the client device. In other words, the client device must not comprise GPS receiver or alternative location device hardware in order for the broker to generate and transmit GPS signalling (or alternate location device signalling) to one or more applications running on one or more remote application servers. This way, only a light browser can be running on the client device, which saves processing power at the side of the client device and further enables any suitable client devices to use applications that run on remote application servers and require specific location signalling like GPS signalling. Additionally, a single broker can emulate a location device for a plurality of client devices and for a plurality of applications in a standardized manner. This further minimizes the processing power and standardizes the processing of geolocation information.

In accordance with the present invention, companies which must protect the security of their employees and/or of their equipment must no longer equip each employee, car, truck, etc., with a GPS device. Similarly, telecom service companies do not have to equip all professionals in charge of installing, replacing or fixing telecom cables with GPS receivers. Location device signalling may for example be used to modify content of an application depending on the geolocation of a user of the application. Location device signalling may for example be used for geo-fencing, thereby modifying access rights of a user of an application depending on the location device signalling. Location device signalling may for example be used for allowing the client device to connect to a network depending on the location device signalling, for example allowing the client device to connect only to networks within a predefined area, such as a city or a country, for example allowing the client device to connect to the network the closest to the location device signalling.

A broker according to the present invention is a connection broker adapted to assign resources to clients, and to provide clients with consistent, reliable access to remote application servers. A broker may be a web broker adapted to mediate between a client browser and a remote application server. Alternatively, a broker may be adapted to mediate between a dedicated client application which is not a client browser, and a remote application server. An application session according to the present invention is an information interchange between a client and a remote application server. An application session is managed by an application server session on a remote application server. Alternatively, the remote application server comprises the transmitting module. The transmitting module is then adapted to transmit the location device signalling to an application server session of the remote application server, thereby emulating a location device.

According to an optional aspect of the invention, the broker is a web broker and the HTML client is an HTML client browser.

A web broker is to be understood as a service broker in service-oriented architecture, i.e. as a broker adapted to mediate between a client browser and a remote application server.

According to an optional aspect of the invention, the geolocation information collecting unit is further adapted to collect the geolocation information from a geolocation application program interface embedded in the HTML client.

Hence, an API embedded in the HTML client of a device may deliver geolocation information that is needed by the broker to emulate a location device. The geolocation application program interface in addition may evaluate how accurate the geolocation information obtained from the HTML client is.

According to an optional aspect of the invention, the geolocation information comprises an Internet Protocol address of the HTML client.

Indeed, an IP address may be sufficient to determine the location of the client device with a certain, albeit limited, accuracy.

According to an optional aspect of the invention, the transmitting module is further adapted to transmit the location device signalling to the application server session via a remote desktop protocol.

This way, transmitting location device signalling to application server sessions running on a remote application server is made simple as it combines location device emulation at the broker with device redirection between broker and application server. Instead of deploying a gateway on each remote application server, the broker acts as a single remote desktop protocol virtual channel session host for all the remote application servers. Each web session can be provided with geographic locations of HTML clients remotely through the broker. Additionally, when the remote desktop protocol virtual channel needs upgrading or patching, the action is performed once on the broker, and is made available to all the remote application servers without further configuration on the remote application servers themselves. Alternatively, the remote application server comprises the transmitting module. The transmitting module is then adapted to transmit the location device signalling to an application server session of the remote application server, thereby emulating a location device.

According to an optional aspect of the invention, the broker further comprises an application streamer adapted to:
  generate a representation of a web page incorporating the application; and
  stream the representation of the web page to the HTML client.

This further enables any suitable HTML client to run applications of remote application servers. The broker streams applications to HTML clients independently from the nature and the version of the operating systems of the HTML clients, and independently from the applications and from the version of the applications running on the remote application servers, and without requiring the installation of specific client software. The web sessions therefore must not be independently configured to be provided with location device signalling. In other words, HTML clients which do not support direct access to remote application servers may however be streamed web sessions of applications from remote application servers by the broker.

According to an optional aspect of the invention, the representation of a web page corresponds to an HTML5 canvas element.

This way, a representation of a web page is streamed in a browser of an HTML client and events at the side of the HTML client may be fetched or pushed to the broker.

According to a second aspect of the present invention, there is provided a method for communicating with an HTML client running on a client device and with an application running on a remote application server through a web session, the method comprising the steps of:
  collecting geolocation information from the HTML client;
  processing the geolocation information, thereby generating location device signalling; and
  transmitting the location device signalling to an application server session of the remote application server, thereby emulating a location device.

Thus, geolocation information is collected from an HTML client running on the client device and is processed to emulate a location device, e.g. a GPS receiver, without requiring such location device to be present at the client device. Geolocation information comprises information useful in determining the geographic location of the client device and available at the HTML client, for example coordinates such as longitude and latitude, an address, a street name, a city, a country, an IP address, etc. The HTML client might be a browser running on the client device, such as a browser running on a laptop computer, a browser running on a tablet, a browser running on a smartphone, or a browser running on any other suitable portable client device. Geolocation information is processed, thereby generating location device signalling, e.g. GPS signalling. The location device signalling is then transmitted, thereby emulating a location device from the collected geolocation information. As a result, GPS signalling, as would be produced by a GPS receiver present at the location of the client device, will be generated.

Geographic locations of client devices are determined from geolocation information collected from a browser running on the client device. In other words, the client device must not comprise GPS receiver or alternative location device hardware in order for the remote application server to generate and transmit GPS signalling (or alternate location device signalling) to one or more applications running on one or more remote application servers. This way, only a light browser can be running on the client device, which saves processing power at the side of the client device and further enables any suitable client devices to use applications that run on remote application servers and require specific location signalling like GPS signalling. Additionally, a location device can be emulated for a plurality of client devices and for a plurality of applications in a standardized manner. This further minimizes the processing power and standardizes the processing of geolocation information.

In accordance with the present invention, companies which must protect the security of their employees and/or of their equipment must no longer equip each employee, car, truck, etc., with a GPS device. Similarly, telecom service companies do not have to equip all professionals in charge of installing, replacing or fixing telecom cables with GPS receivers.

According to a third aspect of the present invention, there is provided a broker for communicating with an HTML client running on a client device and with an application running on a remote application server through a web session, the broker comprising:
 a geolocation information collecting unit, adapted to collect geolocation information from the HTML client;
 a geolocation information transmitting module, adapted to transmit the geolocation information to an application server session of the remote application server, such that the remote application server emulates a location device when processing the geolocation information.

According to the present invention geolocation information is collected from an HTML client running on the client device and is processed to emulate a location device, e.g. a GPS receiver, without requiring such location device to be present at the client device. Geolocation information comprises information useful in determining the geographic location of the client device and available at the HTML client, for example coordinates such as longitude and latitude, an address, a street name, a city, a country, an IP address, etc. The HTML client might be a browser running on the client device, such as a browser running on a laptop computer, a browser running on a tablet, a browser running on a smartphone, or a browser running on any other suitable portable client device. Geolocation information is processed, thereby generating location device signalling, e.g. GPS signalling. The location device signalling is then transmitted, thereby emulating a location device from the collected geolocation information. As a result, GPS signalling, as would be produced by a GPS receiver present at the location of the client device, will be generated. The geolocation information transmitting module can transmit the geolocation information to an application server session of the remote application server, and the application then processes the geolocation information, thereby emulating a location device. Alternatively, the geolocation information transmitting module can transmit the geolocation information to a second application server session of the remote application server, and the second application then processes the geolocation information, thereby generating location device signalling. The second application then transmits the location device signalling to the application server session, thereby emulating a location device.

Geographic locations of client devices are determined from geolocation information collected from a browser running on the client device. In other words, the client device must not comprise GPS receiver or alternative location device hardware in order for the remote application server to generate and transmit GPS signalling (or alternate location device signalling) to one or more applications. This way, only a light browser can be running on the client device, which saves processing power at the side of the client device and further enables any suitable client devices to use applications that run on remote application servers and require specific location signalling like GPS signalling. Additionally, a location device can be emulated for a plurality of client devices and for a plurality of applications in a standardized manner. This further minimizes the processing power and standardizes the processing of geolocation information. Geolocation information can be sent to all the application server sessions of a same client device running on different remote application servers. In other words, the same geolocation information can be multicast to all application server sessions of a client device potentially running on different remote application servers.

According to fourth aspect of the invention, there is provided a method for communicating with an HTML, client running on a client device and with an application running on a remote application server through a web session, the method comprising the steps of:
 collecting geolocation information from the HTML client by a broker;
 transmitting the geolocation information by the broker to an application server session of the remote application server, such that the remote application server emulates a location device when processing the geolocation information.

DETAILED DESCRIPTION OF EMBODIMENT(S)

Figure 1:
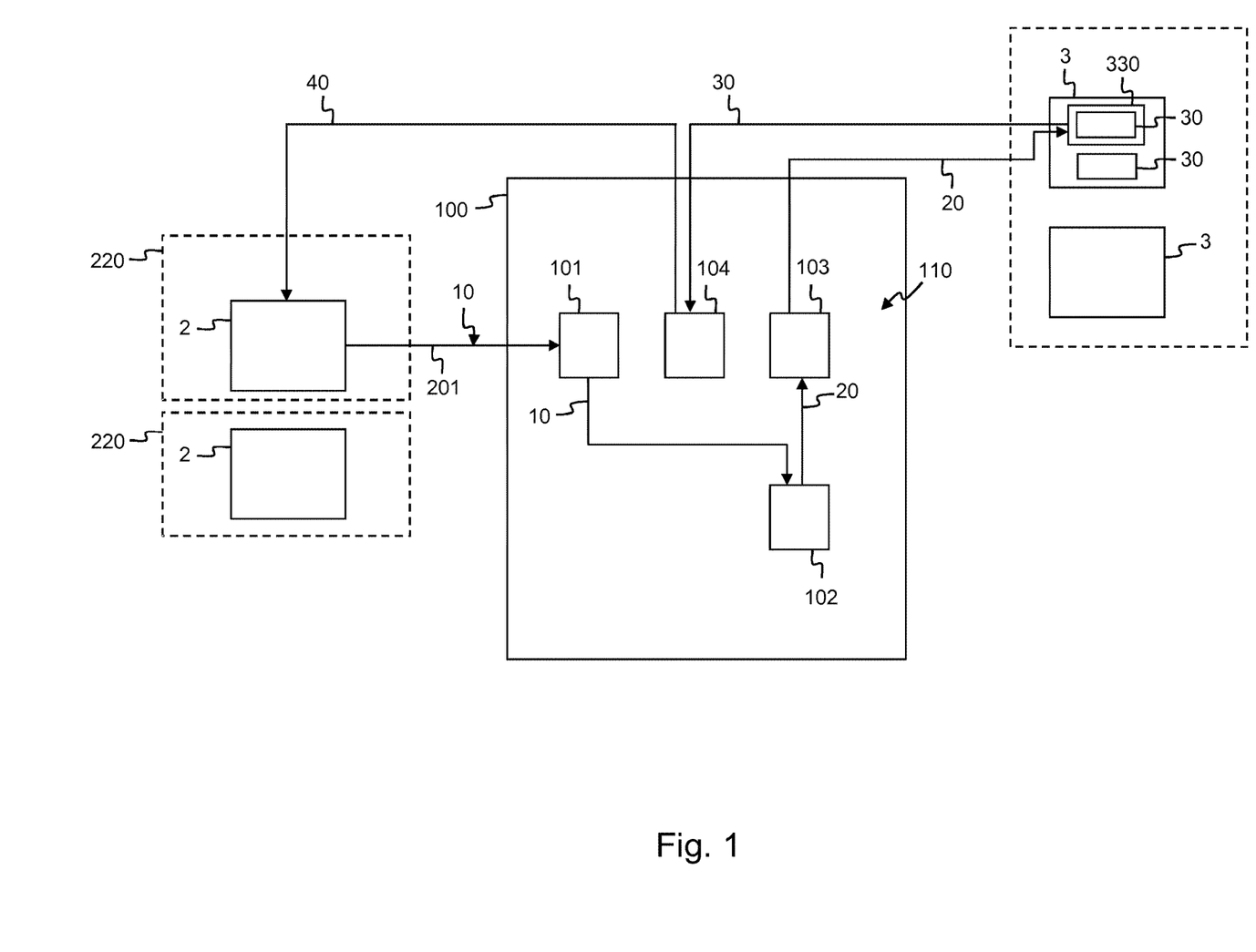
FIG. 1 schematically illustrates an embodiment of a broker according to the present invention.

According to an embodiment shown in FIG. 1, a broker 100 for communicating with an HTML client 2 running on a client device 220 and with an application 30 running on a remote application server 3 through a web session comprises a geolocation information collecting unit 101, a geolocation processing engine 102, a transmitting module 103 and an application streamer 104. The geolocation information collecting unit 101 collects geolocation information 10 from the HTML client 2. The geolocation information 10 for example comprises an Internet Protocol address 201 of the HTML client 2. The geolocation processing engine 102 processes the geolocation information 10 and thereby generates location device signalling 20. The transmitting module 103 transmits the location device signalling 20 to an application server session 330 of the remote application server 3, thereby emulating a location device 110. The transmitting module 103 transmits the location device signalling 20 to the application server session 330 of the remote application server 3 via a remote desktop protocol. According to an alternative embodiment, the transmitting module 103 transmits the location device signalling 20 to a remote desktop protocol unit adapted to transmit the location device signalling 20 to a plurality of application server sessions 330 of the remote application server 3. The application streamer 104 generates a representation of a web page 40 incorporating the application 30 and the application streamer 104 streams the representation of the web page 40 to the HTML, client 2 running on the client device 220. The representation of a web page 40 corresponds to an HTML5 canvas element. According to an alternative embodiment, the remote application server 3 comprises the transmitting module 103, and the transmitting module 103 on the remote application server 3 is adapted to receive the location device signalling 20 from the geolocation processing engine 102 of the broker 100 and to transmit the location device signalling 20 to an application server session 330 of the remote application server 3, thereby emulating a location device 110.

Figure 2:
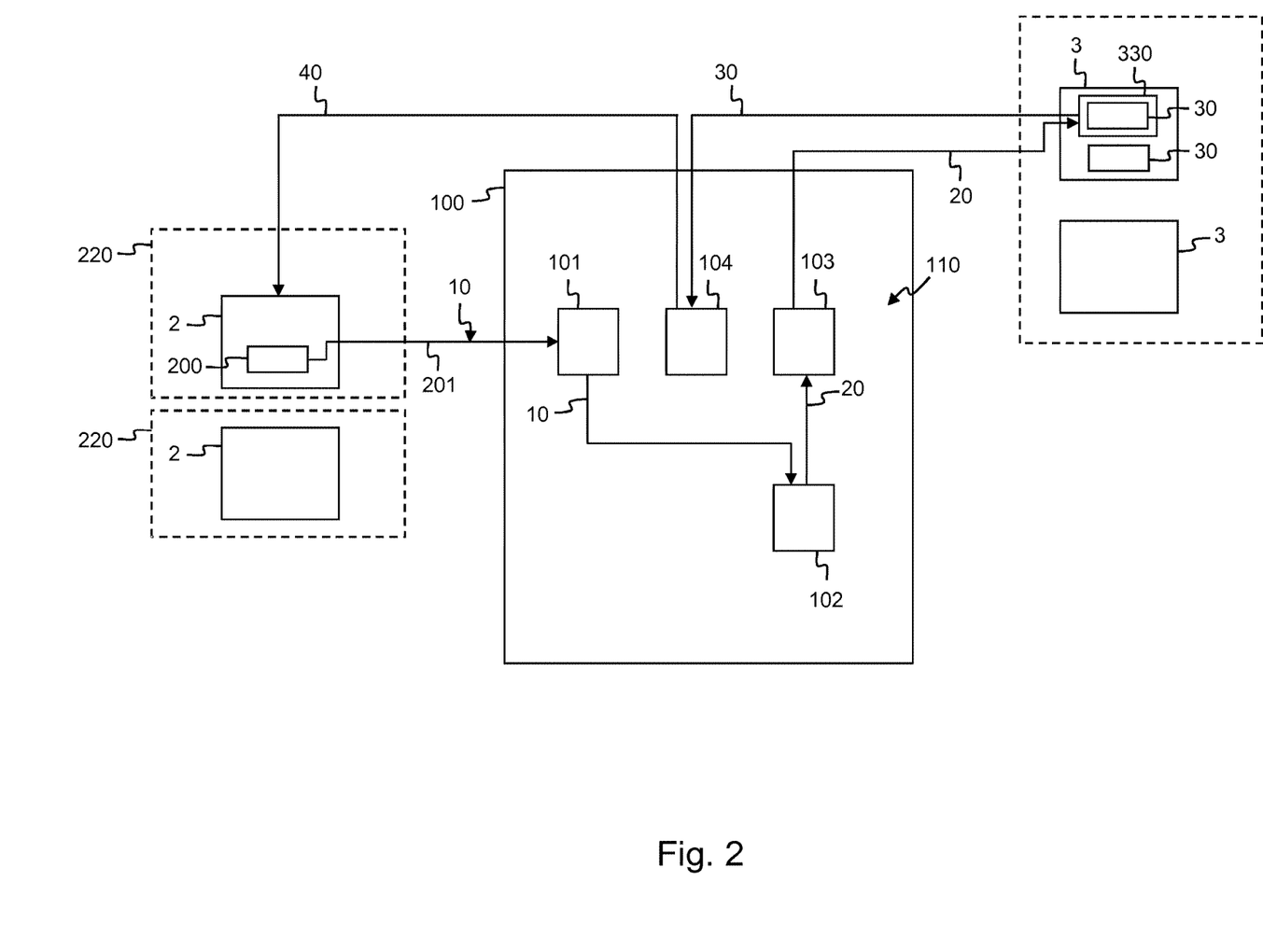
FIG. 2 schematically illustrates an embodiment of a broker according to the present invention wherein an HTML, client comprises a geolocation application program interface.

According to an embodiment shown in FIG. 2, a broker 100 for communicating with an HTML client 2 running on a client device 220 and with an application 30 running on a remote application server 3 through a web session comprises a geolocation information collecting unit 101, a geolocation processing engine 102, a transmitting module 103 and an application streamer 104. The geolocation information collecting unit 101 collects geolocation information 10 from a geolocation application program interface 200 embedded in the HTML client 2. The geolocation information 10 for example comprises an Internet Protocol address 201 of the HTML client 2. The geolocation processing engine 102 processes the geolocation information 10 and thereby generates location device signalling 20. The transmitting module 103 transmits the location device signalling 20 to an application server session 330 of the remote application server 3, thereby emulating a location device 110. The transmitting module 103 transmits the location device signalling 20 to the application server session 330 of the remote application server 3 via a remote desktop protocol. According to an alternative embodiment, the transmitting module 103 transmits the location device signalling 20 to a remote desktop protocol unit adapted to transmit the location device signalling 20 to a plurality of application server sessions 330 of the remote application server 3. The application streamer 104 generates a representation of a web page 40 incorporating the application 30 and the application streamer 104 streams the representation of the web page 40 to the HTML client 2 running on the client device 220. According to an alternative embodiment, the application streamer 104 generates a representation of a web page 40 incorporating the application 30 and the application streamer 104 streams the representation of the web page 40 to two or more HTML clients 2 running on different client device 220 simultaneously, for example to three, four, five, ten, hundreds of HTML clients 2. The representation of a web page 40 corresponds to an HTML5 canvas element. According to an alternative embodiment, the remote application server 3 comprises the transmitting module 103, and the transmitting module 103 on the remote application server 3 is adapted to receive the location device signalling 20 from the geolocation processing engine 102 of the broker 100 and to transmit the location device signalling 20 to an application server session 330 of the remote application server 3, thereby emulating a location device 110.

Figure 3:
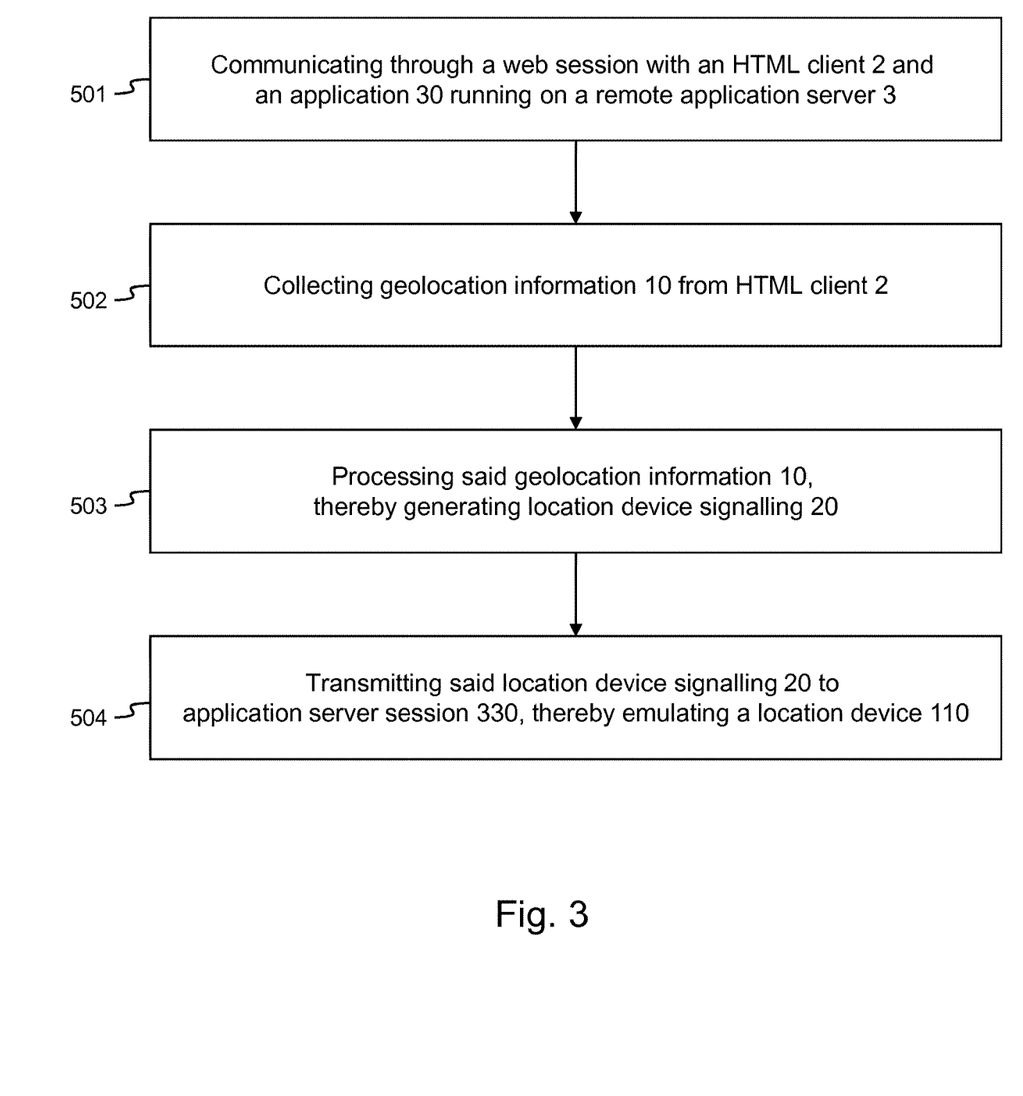
FIG. 3 schematically illustrates the steps of the method according to the present invention.

FIG. 3 schematically illustrates the steps of the method according to the present invention. In step 501, a communication is started through a web session with an HTML client 2 running on a client device 220 and an application 30 running on a remote application server 3. In step 502, geolocation information 10 is then collected from the HTML client 2. Then, the geolocation information 10 is processed, thereby generating location device signalling 20 in step 503. Finally, in step 504, the location device signalling 20 is transmitted to an application server session 330 running on a remote application server 3, thereby emulating a location device 110.

Figure 4:
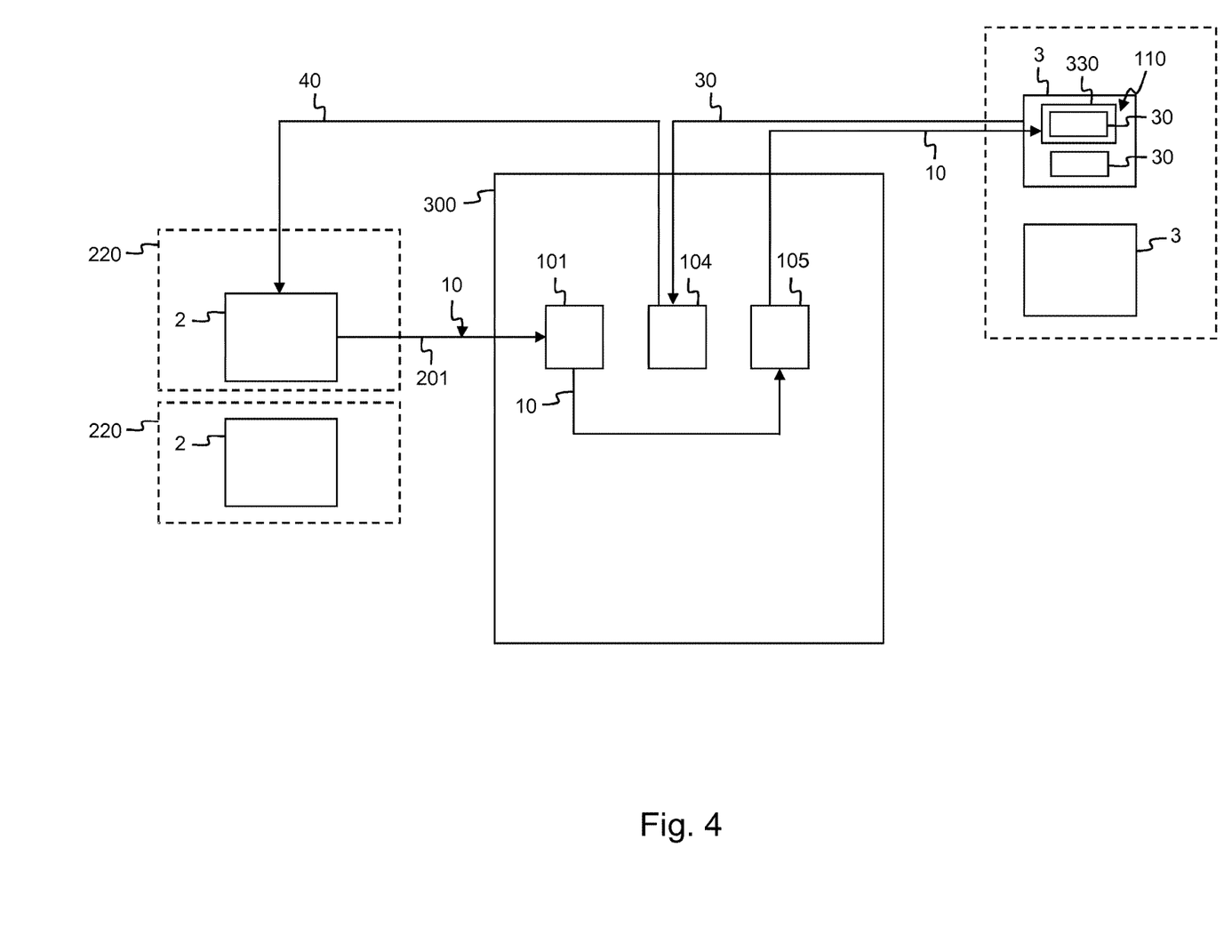
FIG. 4 schematically illustrates an embodiment of a broker according to the present invention which transmits geolocation information to an application server session.

According to an embodiment shown in FIG. 4, a broker 300 for communicating with an HTML client 2 running on a client device 220 and with an application 30 running on a remote application server 3 through a web session comprises a geolocation information collecting unit 101, a geolocation information transmitting module 105 and an application streamer 104. The geolocation information collecting unit 101 collects geolocation information 10 from the HTML client 2. The geolocation information 10 for example comprises an Internet Protocol address 201 of the HTML client 2. The geolocation information transmitting module 105 transmits the geolocation information 10 to an application server session 330 of the remote application server 3. The geolocation information transmitting module 105 transmits the geolocation information 10 to the application server session 330 of the remote application server 3 via a remote desktop protocol. The remote application server 3 processes the geolocation information 10, thereby generating location device signalling, and transmits the location device signalling to the application server session 330. The application streamer 104 generates a representation of a web page 40 incorporating the application 30 and the application streamer 104 streams the representation of the web page 40 to the HTML client 2 running on the client device 220. The representation of a web page 40 corresponds to an HTML5 canvas element. According to an alternative embodiment, the geolocation information transmitting module 105 comprises a geolocation processing engine 102 as described in FIG. 1 or FIG. 2 and/or a transmitting module 103 as described in FIG. 1 or FIG. 2. According to a further alternative embodiment, the geolocation information transmitting module 105 comprises a geolocation processing engine 102 as described in FIG. 1 or FIG. 2 and the remote application server 3 comprises a transmitting module 103 as described in FIG. 1 or FIG. 2.

Figure 5:
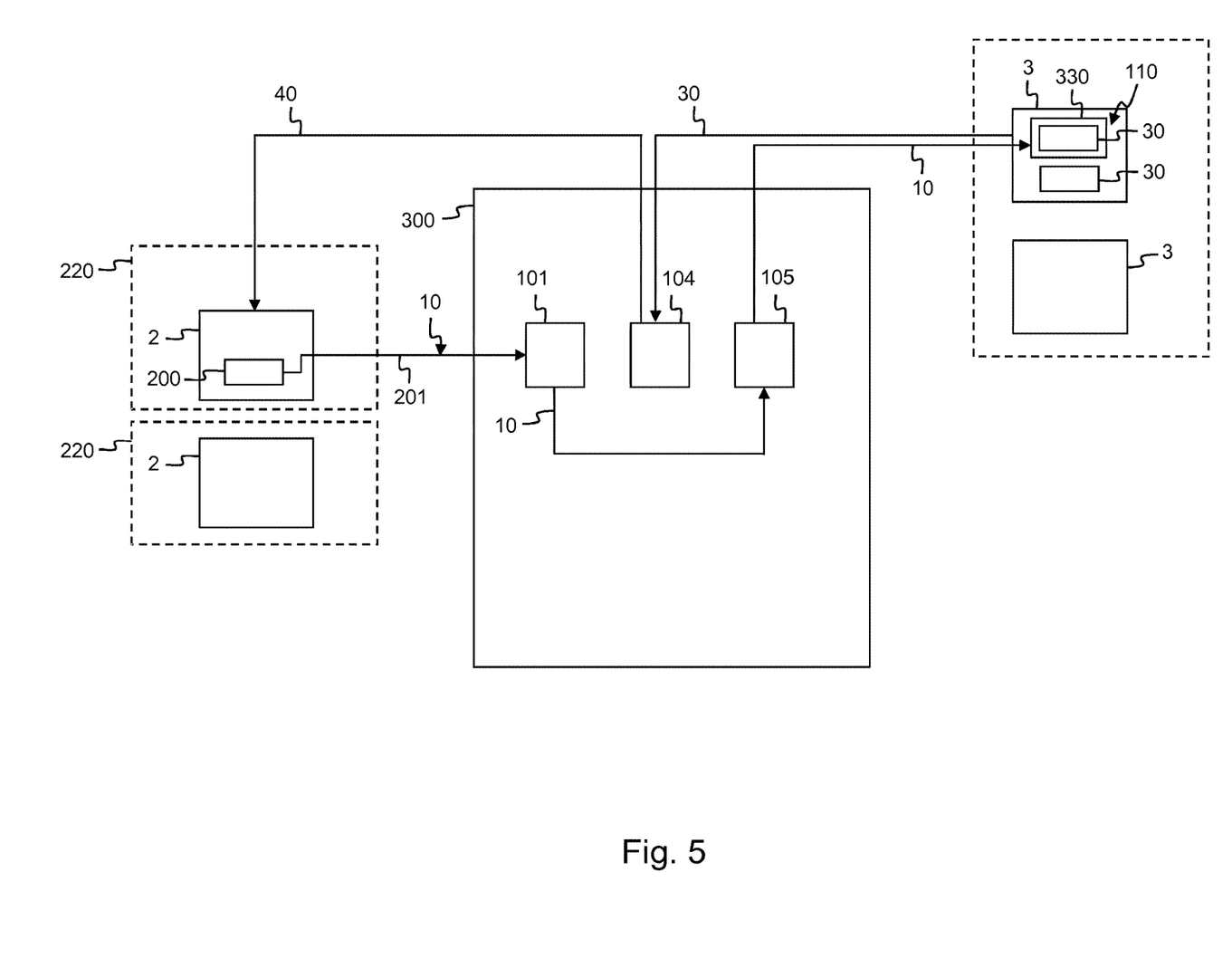
FIG. 5 schematically illustrates an embodiment of a broker according to the present invention which transmits geolocation information collected from a geolocation application program interface to an application server session.

According to an embodiment shown in FIG. 5, a broker 300 for communicating with an HTML client 2 running on a client device 220 and with an application 30 running on a remote application server 3 through a web session comprises a geolocation information collecting unit 101, a geolocation information transmitting module 105 and an application streamer 104. The geolocation information collecting unit 101 collects geolocation information 10 from the HTML client 2. The geolocation information collecting unit 101 collects geolocation information 10 from a geolocation application program interface 200 embedded in the HTML client 2. The geolocation information 10 for example comprises an Internet Protocol address 201 of the HTML client 2. The geolocation information transmitting module 105 transmits the geolocation information 10 to an application server session 330 of the remote application server 3. The geolocation information transmitting module 105 transmits the geolocation information 10 to the application server session 330 of the remote application server 3 via a remote desktop protocol. The remote application server 3 processes the geolocation information 10, thereby generating location device signalling, and transmits the location device signalling to the application server session 330. The application streamer 104 generates a representation of a web page 40 incorporating the application 30 and the application streamer 104 streams the representation of the web page 40 to the HTML client 2 running on the client device 220. The representation of a web page 40 corresponds to an HTML5 canvas element. According to an alternative embodiment, the application streamer 104 generates a representation of a web page 40 incorporating the application 30 and the application streamer 104 streams the representation of the web page 40 to two or more HTML clients 2 running on different client device 220 simultaneously, for example to three, four, five, ten, hundreds of HTML clients 2. The representation of a web page 40 corresponds to an HTML5 canvas element. According to an alternative embodiment, the geolocation information transmitting module 105 comprises a geolocation processing engine 102 as described in FIG. 1 or FIG. 2 and/or a transmitting module 103 as described in FIG. 1 or FIG. 2. According to a further alternative embodiment, the geolocation information transmitting module 105 comprises a geolocation processing engine 102 as described in FIG. 1 or FIG. 2 and the remote application server 3 comprises a transmitting module 103 as described in FIG. 1 or FIG. 2.

Figure 6:
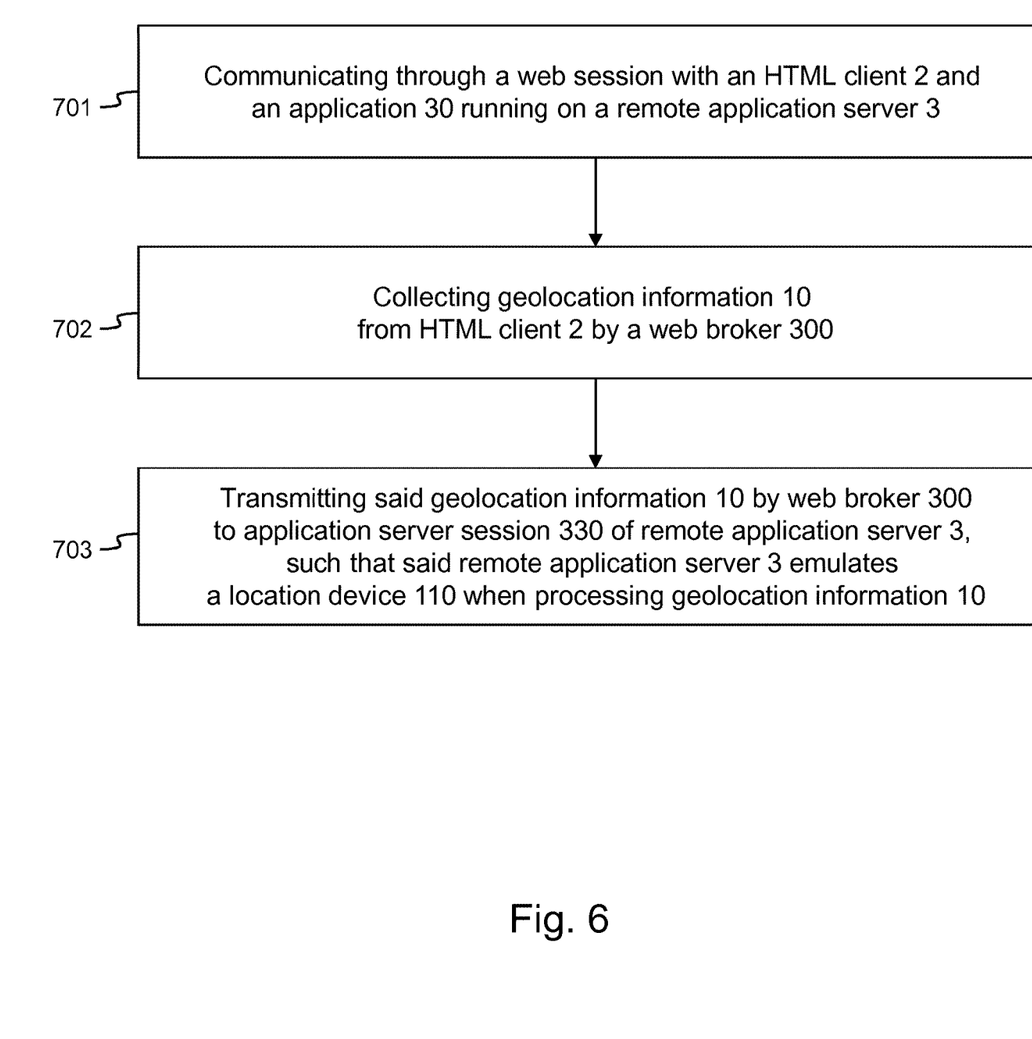
FIG. 6 schematically illustrates the steps of the method according to the present invention wherein a broker transmits geolocation information to an application server session.

FIG. 6 schematically illustrates the steps of the method according to the present invention. In step 701, a communication is started through a web session with an HTML client 2 running on a client device 220 and an application 30 running on a remote application server 3. In step 702, geolocation information 10 is then collected from the HTML client 2 by a broker 300. Finally, in step 503, the geolocation information 10 is transmitted to an application server session 330 of the remote application server 3 by the broker 300, such that the remote application server 3 emulates a location device 110 when processing the geolocation information 10.

Figure 7:
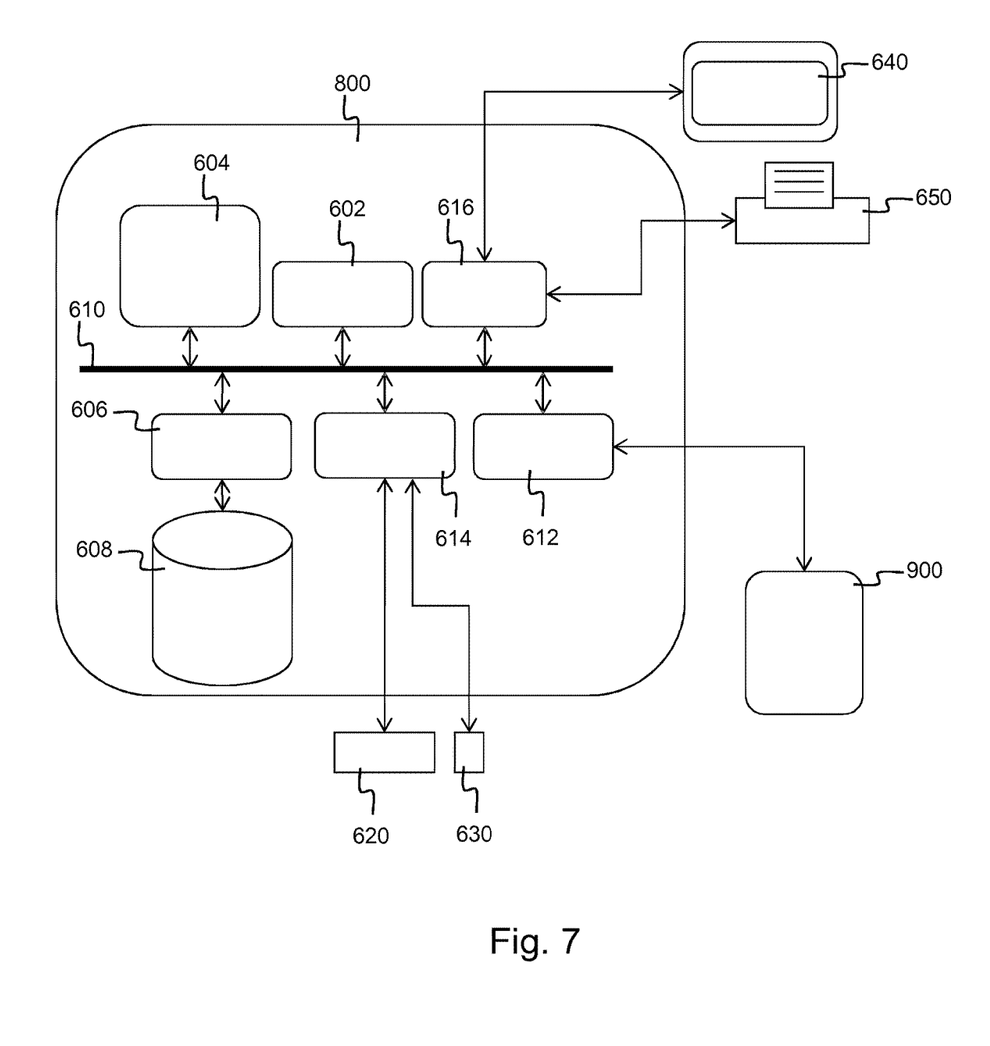
FIG. 7 schematically illustrates a suitable computing system for hosting the broker of FIG. 1 or FIG. 4.

FIG. 7 shows a suitable computing system 800 for hosting the broker of FIG. 1 or FIG. 4. Computing system 800 may in general be formed as a suitable general purpose computer and may comprise a bus 610, a processor 602, a local memory 604, one or more optional input interfaces 614, one or more optional output interfaces 616 a communication interface 612, a storage element interface 606 and one or more storage elements 608. Bus 610 may comprise one or more conductors that permit communication among the components of the computing system. Processor 602 may include any type of conventional processor or microprocessor that interprets and executes programming instructions. Local memory 604 may include a random access memory (RAM) or another type of dynamic storage device that stores information and instructions for execution by processor 602 and/or a read only memory (ROM) or another type of static storage device that stores static information and instructions for use by processor 604. Input interface 614 may comprise one or more conventional mechanisms that permit an operator to input information to the computing device 800, such as a keyboard 620, a mouse 630, a pen, voice recognition and/or biometric mechanisms, etc. Output interface 616 may comprise one or more conventional mechanisms that output information to the operator, such as a display 640, a printer 650, a speaker, etc. Communication interface 612 may comprise any transceiver-like mechanism such as for example two 1Gb Ethernet interfaces that enables computing system 800 to communicate with other devices and/or systems, for example mechanisms for communicating with one or more other computing systems 900. The communication interface 612 of computing system 800 may be connected to such another computing system by means of a local area network (LAN) or a wide area network (WAN, such as for example the internet, in which case the other computing system 680 may for example comprise a suitable web server. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example 1 TB SATA disk drives, and control the reading and writing of data to and/or from these storage elements 608. Although the storage elements 608 above is described as a local disk, in general any other suitable computer-readable media such as a removable magnetic disk, optical storage media such as a CD or DVD, -ROM disk, solid state drives, flash memory cards, . . . could be used.

The broker of FIG. 1 or FIG. 4 can be implemented as programming instructions stored it local memory 604 of the computing system 800 for execution by its processor 602. Alternatively the broker of FIG. 1 or FIG. 4 could be stored on the storage element 608 or be accessible from another computing system 900 through the communication interface 612.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned.

The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A web broker for mediating between an HTML client browser running on a client device and an application running on a remote application server through a web session, said web broker comprising:
   a geolocation information collecting unit, adapted to collect geolocation information from said HTML client browser;
   a geolocation processing engine, configured to process said geolocation information, thereby generating location device signalling;
   a transmitting module, adapted to transmit said location device signalling to an application server session of said remote application server, thereby emulating a location device; and
   an application streamer adapted to:
   generate a representation of a web page incorporating said application; and
   stream said representation of said web page to said HTML client browser;
   wherein the web broker is hosted in a computing system.

2. A web broker according to claim 1, wherein said geolocation information collecting unit is further adapted to collect said geolocation information from a geolocation application program interface embedded in said HTML client browser.

3. A web broker according to claim 1, wherein said geolocation information comprises an Internet Protocol address of said HTML client browser.

4. A web broker according to claim 1, wherein said transmitting module is further adapted to transmit said location device signalling to said application server session via a remote desktop protocol.

5. A web broker according to claim 1, wherein said representation of a web page corresponds to a HTML5 canvas element.

6. A web broker for mediating between an HTML client browser running on a client device and an application running on a remote application server through a web session, said web broker comprising:
   a geolocation information collecting unit, adapted to collect geolocation information from said HTML client browser;
   a geolocation information transmitting module, adapted to transmit said geolocation information to an application server session of said remote application server, such that said remote application server emulates a location device when processing said geolocation information; and
   an application streamer adapted to:
   generate a representation of a web page incorporating said application; and
   stream said representation of said web page to said HTML client browser;
   wherein the web broker is hosted in a computing system.

7. A web broker according to claim 6, wherein said geolocation information collecting unit is further adapted to collect said geolocation information from a geolocation application program interface embedded in said HTML client browser.

8. A web broker according to claim 6, wherein said geolocation information comprises an Internet Protocol address of said HTML client browser.

9. A web broker according to claim 6, wherein said geolocation information transmitting module is further adapted to transmit said geolocation information to said application server session via a remote desktop protocol.

10. A web broker according to claim 6, wherein said representation of a web page corresponds to a HTML5 canvas element.

* * * * *